Patented July 13, 1943

2,324,078

UNITED STATES PATENT OFFICE 2,324,078

SANITARY COATING COMPOSITION

Daniel M. Gray and Franklin M. de Beers, Jr., Sewickley, Pa., assignors to Stoner-Mudge, Inc., Pittsburgh, Pa., a corporation of Pennsylvania No Drawing. Application April 11, 1942, Serial No. 438,588

6 Claims. (Cl. 260—42)

This invention relates to an improved coating composition for lacquering metal, and finds particular application in the coating of tin plate, aluminum sheet, and drawable steel used for fabricating food and beverage containers and closures. It relates specifically to a baking-type sanitary coating composition consisting of a copolymer of a vinyl halide (alone or together with a vinyl ester) and maleic acid or its anhydride as hereinafter particularly set forth, together with an alkaline condensed non-oil-modified phenol-aldehyde resinoid, the whole being dispersed in a mutual solvent for the two resinous components.

In a previous application, filed September 24, 1940, Serial No. 358,106, of which one of us is a co-inventor, there was described a coating composition comprising a polymer or copolymer of a vinyl halide and a vinyl ester admixed with an alkaline condensed non-oil-modified cresol-aldehyde resinoid. The composition of our present invention is not to be confused with the earlier composition; in the composition of application Serial No. 358,106 no chemical reaction between the individual resinous components is possible nor contemplated. On the contrary, our present composition comprises in its two components, resinous bodies capable of desirable mutual interreaction under the influence of heat during the bake, and there results a chemically united heterogeneous complex which differs markedly in its useful properties from those of the earlier invention.

A primary requirement of "sanitary" coatings for food and beverage containers, and for caps and similar fabricated closures, is the ability to withstand exposure to processing and sterilization of the finished package. This processing or sterilization treatment consists of subjecting the sealed up container (of fish or soup for example) to the action of steam or hot water in a closed autoclave under pressure, the time of such treatment varying from about ten minutes to more than 2 hours, depending upon the particular product which is being processed. Temperatures vary in the range of 170° F. to 250° F. It will readily be understood that such treatments are highly destructive to the average resinous coatings, so that the art is continually seeking for new coating compositions which are capable of withstanding processing and sterilization, without at the same time possessing other properties which render them useless as sanitary container linings.

Thus, for example, the art has attempted to employ certain phenol-aldehyde resins as sanitary coatings. While these are capable of withstanding the process treatment without developing "blush," or showing severe film degradation, they are—when properly cured by baking—essentially brittle and incapable of being bent and deformed when applied at the usual film thicknesses for single coat systems. As a result, it is not possible to coat "in the flat" and thereafter stamp out and fabricate the finished closure or container. And if a plasticizing material be added, such as an oil, or other more flexible resin, the resulting mixture of components may fabricate satisfactorily, but will no longer process without blushing or other form of degradation. Further, the added flexibilizing agent almost always shows at least slight solubility in the container contents, and there arises the problem of contamination, with possible toxicity and off-taste acting as effective barriers to their use.

Similarly, attempts have been made to utilize the familiar vinyl and acrylic polymers and copolymers, such as polyvinyl chloride-acetate and methyl methacrylate, as sanitary coatings subjected to processing and sterilization. And it has been found that these resins, alone or admixed with other miscellaneous resinous bodies, are not suited to this purpose. While they are capable of withstanding pasteurizing temperatures (140–160° F.), as soon as the processing temperature exceeds 170° F. they develop a pronounced and deleterious "process blush," which is not only unsightly, but which is visual evidence of profound film degradation, softening, and loss of adhesion. Such blushed films are not protective of the underlying metal, and the art is unable to utilize them as container coatings for foods and beverages which require a high temperature process.

Another primary requirement of sanitary coatings is their ability to adhere tightly to the underlying sheet of metal, whether this be first primed or not. This adhesion must be sufficient to insure no loosening or peeling when the coated flat sheet is stamped and formed into the finished container or closure. The coating must remain protective to the metal after even the most severe drawing, seaming, or threading operations. And the coating must be capable of developing this adhesion on reasonable and practical baking schedules, where for technical reasons the baking temperatures should not exceed 350–425° F., and baking times may not exceed 10–30 minutes.

A third primary requirement of sanitary coatings is their permanent freedom from toxic or flavor conferring constituents, coupled with a high degree of stability toward organic acids and esters, fats and greases, salts and similar bodies found in foods and beverages.

Thus it will be seen that the limitations on resinous compositions suitable for sanitary coatings are highly restrictive, and that the art has great difficulty in finding compositions which satisfy all of these demands in optimum degree.

It is an object of our invention to provide a coating composition capable of being coated on metal sheets and thereafter baked, to yield a coated sheet which can be fabricated into the most extreme closures and containers without loss of adhesion or of film integrity; and the resulting container or closure is capable of withstanding sterilization conditions even beyond those ordinarily encountered without deleterious film degradation such as "blushing" or discoloration or dulling or loss of adhesion and protective ability; and this objective is attained while employing a resinous composition free from soluble constituents, and free from any toxic or flavor conferring ingredients.

We have found that these objectives may be attained in high degree by employing as the filmforming components of our sanitary coating composition a mixture of (1) a copolymer of a vinyl halide, either alone or together with a vinyl ester of a saturated lower aliphatic monocarboxylic acid, and maleic acid or its anhydride, and (2) a non-oil-modified, alkaline condensed, phenolaldehyde resinoid derived from phenol or its lower alkyl and/or aryl derivatives. It will be understood that the term "phenol-" is meant to be inclusive of phenol itself together with its alkyl and aryl homologs.

For convenience, the terms "lower aliphatic" and "lower alkyl" will be used throughout the specification to designate saturated aliphatic radicals containing no more than 6 carbon atoms. Thus, by "vinyl ester of a lower aliphatic monocarboxylic acid" we mean vinyl formate, vinyl acetate, vinyl propionate, vinyl butyrate, and the higher aliphatic homologs, containing up to 6 carbon atoms in the alkyl group attached to the esterifying carboxyl group. By the term "lower aryl" we mean to include only those aryl groups containing one benzene ring and its homologs containing up to a total of 6 carbon atoms in the substituting alkyl groups. It will thus be understood that when we are dealing with phenolic resinoids derived from simple alkyl-substituted phenols, the total number of carbon atoms in the alkyl group attached to the parent phenol nucleus may not exceed 6, and that these may form a single substituting alkyl group, or may be comprised within several smaller alkyl groups. Similarly, when we are dealing with resinoids derived from aryl-substituted phenols, the total number of benzene groups attached to the parent phenolic nucleus may not exceed 1, and this single aryl group may itself be substituted with alkyl groups up to a total of 6 carbon atoms in the substituting alkyl groups.

The mixed copolymers of vinyl halides, vinyl esters, and maleic acid (or anhydride) which we use as our component 1 are known to the art. They result from the conjoint polymerization of vinyl halides—alone or simultaneously with a lower aliphatic vinyl ester—together with a minor proportion of maleic acid or maleic anhydride. For convenience, throughout the specification hereafter the term "maleic acid" will be understood to be inclusive of maleic anhydride as well. For purposes of precise definition our component 1 will hereafter be referred to as "a copolymer of a maleic derivative selected from the group consisting of maleic anhydride and maleic acid and a vinyl derivative responding to the formula $CH_2=CHX$ in which X is selected from a group consisting of the halogens and the saturated aliphatic monocarboxylic acyloxyl radicals containing no more than 6 carbon atoms in the alkyl group attached to the esterifying carboxyl group," and it will be understood that we mean to include within this definition copolymers of maleic acid (or anhydride) with a vinyl halide alone, with a vinyl ester alone, or with a vinyl halide and a vinyl ester simultaneously.

We have found it desirable to employ as our component 1 copolymers in which the percentage by weight of maleic acid (or anhydride) lies between the limits of 1% and 5%, the balance being a vinyl derivative as previously described. In general, we prefer to have vinyl chloride as the major constituent of the vinyl portion of the maleic-vinyl copolymers.

Several preferred compositions for our component 1 are as follows:

|  | Per cent by weight |
|---|---|
| (a) Vinyl chloride | 85 |
| Vinyl acetate | 13 |
| Maleic acid | 2 |
|  |  |
| (b) Vinyl chloride | 95 |
| Vinyl acetate | 4 |
| Maleic anhydride | 1 |
|  |  |
| (c) Vinyl chloride | 50 |
| Vinyl acetate | 47 |
| Maleic acid | 3 |
|  |  |
| (d) Vinyl chloride | 87 |
| Vinyl acetate | 8 |
| Maleic acid | 5 |
|  |  |
| (e) Vinyl chloride | 98 |
| Maleic anhydride | 2 |
|  |  |
| (f) Vinyl chloride | 88 |
| Vinyl acetate | 11 |
| Maleic acid |  |

It is important that the degree of polymerization of our component 1 be controlled within fairly close limits. The degree of polymerization may not be too low, to the end that unstable, brittle, relatively soft and pervious polymers be not formed; the degree of polymerization may not be too high, to the end that insoluble or too sparingly soluble, rubbery, non-adherent copolymers be not formed. We advantageously employ copolymers having molecular weights in the range of 5,000 to 45,000 as determined by the familiar Staudinger viscosity methods. Our preferred materials have absolute viscosities in the range of 80 to 200 centipoises (determined on 18% solutions in pure methyl isobutyl ketone at 20° C.). This roughly corresponds to average molecular weights in the range of 8,000 to 20,000.

We are able to employ as our component 2 any non-oil-modified, alkaline condensed phenol-aldehyde resinoid or lower alkyl-substituted or aryl-substituted phenol-aldehyde resinoid. Typical of phenolic bodies from which the resinoid may be derived are:

Phenol itself:

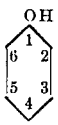

3,5-dimethyl phenol (sym. xylenol)
3-methyl phenol (m-cresol)
2-methyl phenol (o-cresol)
2,3-dimethyl phenol (2,3-xylenol)
2,3,5-trimethyl phenol (2,3,5-cumenol)
2-phenyl phenol (o-phenyl phenol)
2-methyl, 3-ethyl phenol
2,5-dimethyl phenol
2-tolyl phenol (o-tolyl phenol)
2-isopropyl phenol
2-tert. butyl phenol
2-sec. amyl phenol
p-Cresol
p-Tert. butyl phenol
p-Sec. amyl phenol
3,4-dimethyl phenol (3,4-xylenol)
3-methyl, 4-isopropyl phenol For purposes of precise definition our component 2 will hereafter be referred to as "a ketone-soluble resinoid selected from the group consisting of the non-oil-modified, alkaline condensed, phenol-formaldehyde resinoids, alkyl-substituted phenol-formaldehyde resinoids in which the total number of carbon atoms in the alkyl groups attached to the parent phenol nucleus comprises no more than 6, and mono-aryl-substituted phenol-formaldehyde resinoids in which the total number of carbon atoms comprised within the substituting aryl group does not exceed 12 of which 6 are constituted within a benzene ring and the remainder are found in alkyl groups modifying that benzene ring."

The non-oil-modified, alkaline condensed, phenol-aldehyde resinoids which comprise our component 2 are known to the art, where they are employed for widely unrelated purposes. Alone, employed in coating compositions, they yield hard, very brittle, easily shatterable films when baked under the usual conditions.

It is essential for the purposes of our invention that the resinoid which is our component 2 be derived from the previously defined phenolic body and aldehyde (typically formaldehyde) in such proportions that the aldehyde/phenol molal ratio exceeds 0.5/1; and that the catalyst be alkaline, such as ammonia, caustic soda, sodium carbonate, triethanolamine, morpholine, or similar base. In this manner there is assured a resinoid which is at once capable of further condensation with itself, and at the same time possesses free hydroxymethylene groups capable of desirable inter-esterification with the carboxylic acid groups residing within the maleic portion of our component 1, during the bake.

From our description it will be clear to those skilled in the art that what we have invented and desire to protect by Letters Patent, is a two-component sanitary coating composition in which all of the desirable properties of non-toxicity, ease of fabrication, freedom from flavor, and extreme stability toward food acids and esters which are characteristic of vinyl polymers and copolymers containing a major proportion of a vinyl halide, are combined (by means of chemical mutual inter-reaction between the two components during the bake) with the equally desirable properties of hardness, inertness to attack by high temperatures and water vapor, and high adhesiveness, which are characteristic of baked phenolic resins.

It should be emphasized that this desirable combination of properties is attainable only by virtue of the mutual inter-reaction between the two resinous components of our coating composition, during the process of baking the sheet or surface upon which the coating composition is spread. There is no inter-reaction between the two components while they are mutually present in solution in suitable solvents. Thus, it may be said of our coating compositions that they are "package stable."

There appears to be a rather well-defined limitation on the amount of component 2 which can be effectively combined with component 1. Thus, compositions containing less than 3% weight of component 2 resemble in all their properties, component 1 alone. At or above 3% of component 2 a startling improvement in adhesion and particularly in process blush resistance results; with increasing amounts of component 2 up to 15-25% an increase in adhesion and blush resistance follows closely; amounts of component 2 in excess of 35% appear to be ineffective, and serve only to dilute or extend the really useful compositions. Accordingly, we prefer to use compositions in which the concentration of component 2 lies between 3% and 35% by weight, based on the total of components 1 and 2; our optimum compositions contain 15-20% by weight of component 2.

Formulation of our sanitary coating compositions offers no difficulty. We prefer to employ aliphatic ketones as solvents; typical are methyl isobutyl ketone, methyl amyl ketone, methyl propyl ketone, cyclohexanone, isophorone, and mesityl oxide. Other suitable solvents are dioxan and nitro paraffins such as 2-nitropropane and nitroethane. As diluents we prefer to use aromatic hydrocarbons such as toluol, xylol, hi-flash naphtha, tetrahydronaphthalene, decahydronaphthalene and their homologs. If desired, plasticizers may be added, of which dibutyl cellosolve phthalate and diamyl phthalate are typical. Generally we prefer not to employ added plasticizers, since blush resistance is reduced by their inclusion.

Our two-component sanitary coatings are remarkably thermally stable in themselves, and will suffer baking on even very active metal surfaces at temperatures in excess of 350-375° F. without decomposition. Where it is desired to bake at temperatures exceeding these limits, the addition of small amounts of suitable thermal stabilizer, such as those disclosed in U. S. Patent 2,208,216 and there applied to stabilizing vinyl halide-vinyl ester copolymers, will serve. Such stabilizer addition need not exceed 0.5-1.0% by weight of the total resinous solids.

The following exemplary formulations will serve to illustrate our invention, it being understood that we are not limited to the specific compositions or proportions therein disclosed, except by such limitations as are imposed by the disclosures in this specification.

Example I (1) Copolymer of—
    Vinyl chloride _____ 87% ⎫
    Vinyl acetate _____ 12% ⎬ -- 16.0%
    Maleic acid _____ 1% ⎭
(2) o-Cresol formaldehyde resinoid ⎫
    Aldehyde/cresol ratio—1.5/1 ⎬ ---- 4.0%
Solvent mixture:
    Xylol _____ 56.0%
    Isophorone _____ 24.0%
                                               100.0%

Example II (1) Copolymer of—
    Vinyl bromide _____ 70% ⎫
    Vinyl propionate _____ 28% ⎬ --19.0%
    Maleic anhydride _____ 3% ⎭
(2) Phenol formaldehyde resinoid ⎫
    Aldehyde/phenol ratio—0.7/1 ⎬ ----- 1.0%
Solvent mixture:
    Cyclohexanone _____ 20.0%
    Acetone _____ 20.0%
    Methyl isobutyl ketone _____ 40.0%
                                               100.0%

Example III (1) Copolymer of—
    Vinyl chloride _____ 98% ⎫ -- 13.0%
    Maleic acid _____ 2% ⎭
(2) o-Phenyl phenol formaldehyde ⎫
    resinoid ⎬ ----- 7.0%
    Aldehyde/phenol ratio—2/1 ⎭
Solvent mixture:
    Xylol _____ 50.0%
    Cyclohexanone _____ 30.0%
    Isophorone _____ 20.0%
                                               100.0%

All of the above illustrative formulations are clear, stable golden yellow solutions which may be applied to a sheet of tinplate, aluminum, or cold reduced steel, for example and thereafter baked for 10-30 minutes at temperatures ranging from 325°-380° F., the temperature of baking being proportional to the concentration of component 2. The resulting clear, golden colored lacquered metal sheet may be fabricated into the familiar food or beverage containers, or into screw-top closures or caps, without degradation or loss of adhesion of the coating. The so lacquered objects may then be processed in live steam at 240° F. for 30 minutes to 2 hours or more without deleterious loss of gloss, sacrifice of adhesion, or evidence of moisture blush or other film degradation.

Similar tinplate or sheet iron surfaces coated with our component 1 alone, and treated in the same manner, give less adherent films, with evidence of peeling after fabrication; upon processing with live steam, the films are whitened and dulled, and readily peel off the metal. It is thus apparent that only additions of our component 2 yield compositions capable of being processed without appreciable loss of film integrity.

Now, having described our invention, and having pointed out the advantages attendant on its use, we claim as our invention:

1. A thermally stable coating composition adapted to be spread upon metal and thereafter baked with consequent release of solvent and chemical inter-reaction between the resinous components, in which the resinous components comprise (1) 97 to 65 parts by weight of a copolymer of a maleic derivative selected from the group consisting of maleic anhydride and maleic acid, and a vinyl derivative responding to the formula $CH_2=CHX$ in which X is selected from a group consisting of the halogens and the saturated aliphatic monocarboxylic acyloxyl radicals containing no more than 6 carbon atoms in the alkyl group attached to the esterifying carboxyl group, wherein the percentage by weight of maleic derivative lies between 1 and 5; and (2) 3 to 35 parts by weight of a ketone-soluble resinoid selected from the group consisting of the non-oil-modified, alkaline condensed, phenol-formaldehyde resinoids, alkyl-substituted phenol-formaldehyde resinoids in which the total number of carbon atoms in the alkyl groups attached to the parent phenol nucleus comprises no more than 6, and mono-aryl-substituted phenol-formaldehyde resinoids in which the total number of carbon atoms comprised within the substituting aryl group does not exceed 12 of which 6 are constituted within a benzene ring and the remainder are found in alkyl groups modifying that benzene ring; a baked-out film of which is capable of withstanding fabrication and sterilization processes without sacrificing coating integrity and adhesion, or manifesting deleterious process blush and loss of gloss.

2. The composition of claim 1, in which resinous component 1 consists of a conjoint polymer of 1 to 5% by weight of a maleic derivative selected from the group consisting of maleic anhydride and maleic acid, 50 to 99% by weight of vinyl chloride, and the remainder is vinyl acetate.

3. The composition of claim 1, in which resinous component 1 consists of a conjoint polymer of 1% maleic acid, 95% vinyl chloride, and 4% vinyl acetate.

4. The composition of claim 1, in which the phenolic resinoid component 2 is derived from ortho cresol and formaldehyde.

5. The composition of claim 1, in which the resinous component 1 is a conjoint polymer of 1% maleic acid, 87% vinyl chloride, and 12% vinyl acetate, and the phenolic resinoid component 2 is an alkali-catalyzed condensation product of formaldehyde and ortho cresol in which the molar ratio of aldehyde to cresol exceeds 0.5 to 1.

6. A sheet of metal bearing on at least one surface a baked-on coating composition comprising (1) 97 to 65 parts by weight of a conjoint polymer of a maleic derivative selected from the group consisting of maleic anhydride and maleic acid, and a vinyl derivative responsive to the formula $CH_2=CHX$ in which X is selected from the group consisting of the halogens and the saturated aliphatic monocarboxylic acyloxyl radicals containing no more than 6 carbon atoms in the alkyl group attached to the esterifying carboxyl group, wherein the percentage by weight of maleic derivative lies between 1 and 5; and (2) 3 to 35 parts by weight of a ketone-soluble resinoid selected from the group consisting of the non-oil-modified, alkaline condensed, phenolformaldehyde resinoids, alkyl-substituted phenolformaldehyde resinoids in which the total number of carbon atoms in the alkyl groups attached to the parent phenol nucleus comprises no more than 6, and mono-aryl-substituted phenol-formaldehyde resinoids in which the total number of carbon atoms comprised within the substituting aryl group does not exceed 12 of which 6 are constituted within a benzene ring and the remainder are found in alkyl groups modifying that benzene ring; said coated sheet of metal being capable of fabrication and sterilization in live steam without deleterious loss of adhesion, gloss, or film integrity, on the part of the coating.

DANIEL M. GRAY.
FRANKLIN M. DE BEERS, JR.